US011778435B2

(12) United States Patent
Cheng et al.

(10) Patent No.: US 11,778,435 B2
(45) Date of Patent: Oct. 3, 2023

(54) SIDELINK ASSISTED CELLULAR OPERATION OPTIMIZATION

(71) Applicant: QUALCOMM Incorporated, San Diego, CA (US)

(72) Inventors: Hong Cheng, Basking Ridge, NJ (US); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/192,750

(22) Filed: Mar. 4, 2021

(65) Prior Publication Data

US 2022/0286827 A1 Sep. 8, 2022

(51) Int. Cl.
*H04W 76/27* (2018.01)
*H04W 4/44* (2018.01)
*H04W 4/02* (2018.01)
*H04W 80/02* (2009.01)

(52) U.S. Cl.
CPC ............. *H04W 4/44* (2018.02); *H04W 4/027* (2013.01); *H04W 76/27* (2018.02); *H04W 80/02* (2013.01)

(58) Field of Classification Search
CPC ....... H04W 4/44; H04W 4/027; H04W 76/27; H04W 80/02
See application file for complete search history.

(56) References Cited

U.S. PATENT DOCUMENTS

| | | |
|---|---|---|
| 2013/0324114 A1 | 12/2013 | Raghothaman et al. |
| 2015/0111560 A1 | 4/2015 | Rogitz |
| 2016/0014589 A1 | 1/2016 | Niu et al. |
| 2017/0134080 A1 | 5/2017 | Rahman et al. |
| 2018/0035255 A1 | 2/2018 | Kordybach et al. |
| 2018/0070281 A1 | 3/2018 | Wu et al. |
| 2018/0295534 A1 | 10/2018 | Huang et al. |
| 2019/0021040 A1 | 1/2019 | Chae et al. |
| 2019/0028862 A1 | 1/2019 | Futaki |
| 2019/0116475 A1 | 4/2019 | Lee et al. |
| 2019/0223231 A1 | 7/2019 | Muraoka et al. |

(Continued)

FOREIGN PATENT DOCUMENTS

| | | |
|---|---|---|
| EP | 3133842 B1 | 7/2019 |
| EP | 3644634 A1 | 4/2020 |

(Continued)

OTHER PUBLICATIONS

International Search Report and Written Opinion—PCT/US2022/015122—ISA/EPO—dated May 12, 2022.

(Continued)

*Primary Examiner* — Lakeram Jangbahadur
(74) *Attorney, Agent, or Firm* — Patterson + Sheridan, LLP

(57) ABSTRACT

Certain aspects of the present disclosure provide apparatus, methods, processing systems, and computer readable mediums for using information related to a sidelink to optimize operation on a cellular link. According to certain aspects, using a vehicle to everything (V2X) ID of a UE (or a device associated with the UE, such as a vehicle), a base station (e.g., a gNB) may obtain information about the UE from a roadside unit (RSU). The base station may use this information (e.g., UE location, speed, or path information) to help optimize cellular communications with the UE.

26 Claims, 15 Drawing Sheets

(56) References Cited

U.S. PATENT DOCUMENTS

| | | |
|---|---|---|
| 2019/0327618 A1 | 10/2019 | Li et al. |
| 2019/0360823 A1 | 11/2019 | Nelson et al. |
| 2020/0107172 A1* | 4/2020 | Bharadwaj ............ H04W 92/18 |
| 2020/0120458 A1* | 4/2020 | Aldana .................. H04W 4/08 |
| 2020/0146094 A1* | 5/2020 | Wu ........................ H04W 4/70 |
| 2020/0154501 A1* | 5/2020 | Cheng .................... H04W 4/70 |
| 2020/0288535 A1 | 9/2020 | Sharma et al. |
| 2021/0153270 A1 | 5/2021 | Wang et al. |
| 2021/0185685 A1 | 6/2021 | Ryu et al. |
| 2021/0250910 A1 | 8/2021 | Park et al. |
| 2021/0273714 A1* | 9/2021 | Lee ....................... H04B 7/088 |
| 2021/0282098 A1 | 9/2021 | Luo et al. |
| 2021/0357940 A1 | 11/2021 | Benkreira et al. |
| 2022/0070844 A1 | 3/2022 | Lee et al. |
| 2022/0229146 A1 | 7/2022 | Ko et al. |
| 2022/0256357 A1 | 8/2022 | Kim et al. |
| 2022/0287001 A1 | 9/2022 | Wu et al. |
| 2022/0287113 A1 | 9/2022 | Wu et al. |

FOREIGN PATENT DOCUMENTS

| | | |
|---|---|---|
| EP | 3687195 A1 | 7/2020 |
| JP | 2019212954 A | 12/2019 |
| WO | 2017134578 A1 | 8/2017 |

OTHER PUBLICATIONS

Massimo C., et al., "5G V2X System-Level Architecture of 5GCAR Project", Future Internet, vol. 11, No. 10, Oct. 19, 2019 (Oct. 19, 2019), XP055859654, 26 Pages, DOI: 10.3390/fi11100217 p. 1-p. 26.

* cited by examiner

SIDELINK ASSISTED CELLULAR OPERATION OPTIMIZATION

BACKGROUND

Field of the Disclosure

Aspects of the present disclosure relate to wireless communications, and more particularly, to techniques for utilizing information obtained via a sidelink to help optimize cellular operation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a UE. The method generally includes providing, to a network entity via a second link, an indication of a first identifier (ID) used for sidelink communications with a wireless node on a first link, receiving information from the network entity, adjusting one or more parameters based on the information, and communicating with the network entity via the second link based on the one or more adjusted parameters.

Certain aspects provide a method for wireless communication by a wireless node. The method generally includes receiving one or more sidelink messages from a user equipment (UE) via a first link using a first identifier (ID) for the UE, receiving, via a second link, a request from a network entity for information associated with at least the first ID, and transmitting, via the second link, a message to the network entity including the requested information associated with the first ID.

Certain aspects provide a method for wireless communication by a network entity. The method generally includes receiving, from a user equipment (UE), a message indicating a first identifier (ID) for a sidelink communication, transmitting a request, including the first ID, to a wireless node for information associated with at least one of the first ID, receiving, from the wireless node, a message including the requested information associated with the first ID, and adjusting one or more parameters for communications between the UE and the network entity based on the requested information.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
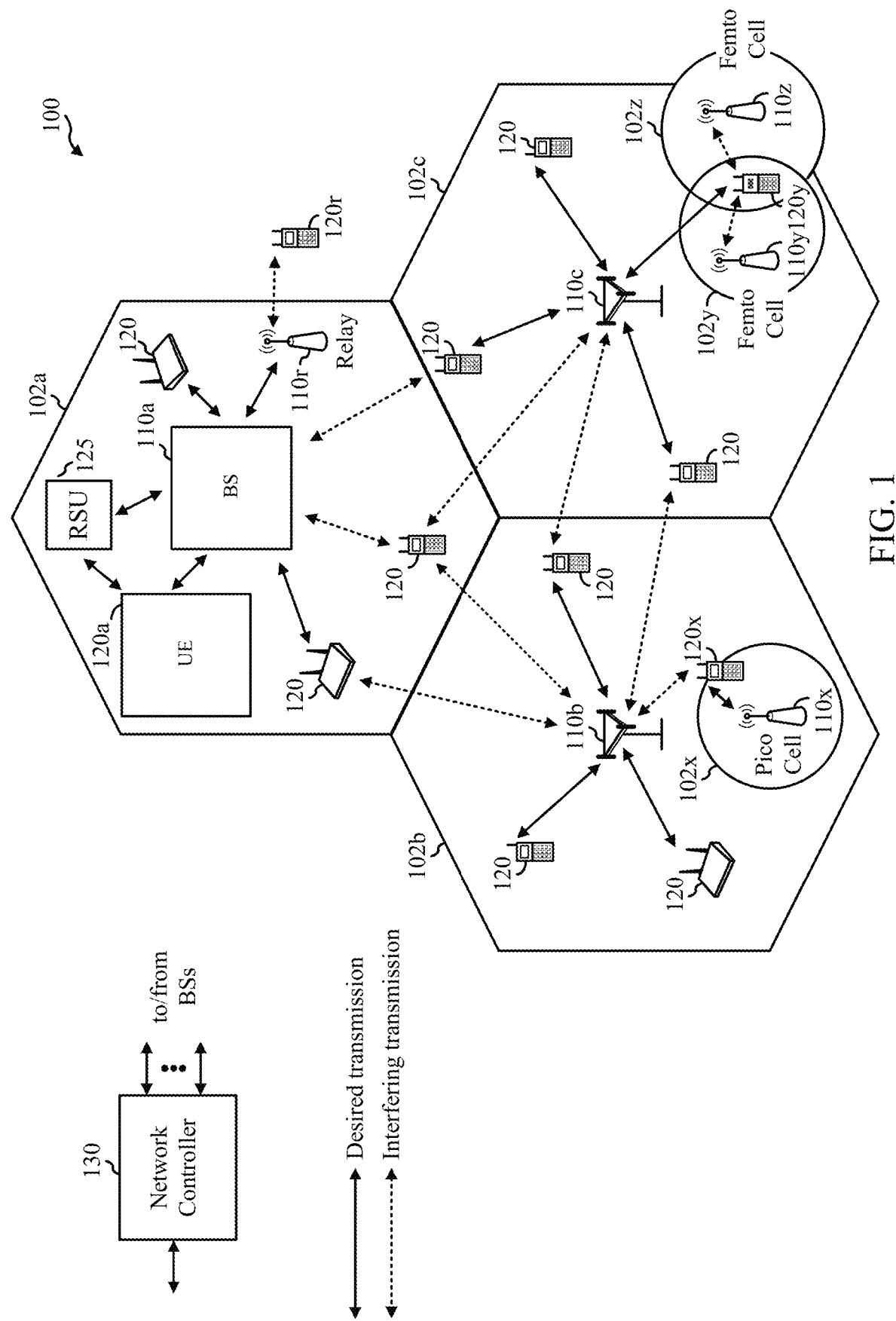
FIG. 1 is a block diagram conceptually illustrating an example telecommunications system, in accordance with certain aspects of the present disclosure.

Aspects of the present disclosure provide apparatus, methods, processing systems, and computer readable mediums for using information related to a sidelink to optimize operation on a cellular link. For example, using a vehicle to everything (V2X) ID of a UE (or a device associated with the UE, such as a vehicle), a base station (e.g., a gNB) may obtain information about the UE from a roadside unit (RSU). The base station may use this information (e.g., UE location, speed, or path information) to help optimize cellular communications with the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, the wireless communication network 100 may include one or more UEs 120a, which may be V2X (vehicle-to-everything) or V2V (vehicle-to-vehicle) UEs configured to perform operations described below with reference to FIG. 8. The wireless communication network 100 may include one or more base stations (BSs, such as gNBs) 110a configured to perform operations described below with reference to FIG. 10 and/or one or more roadside units (RSUs) 125 configured to perform operations described below with reference to FIG. 9.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wristband, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
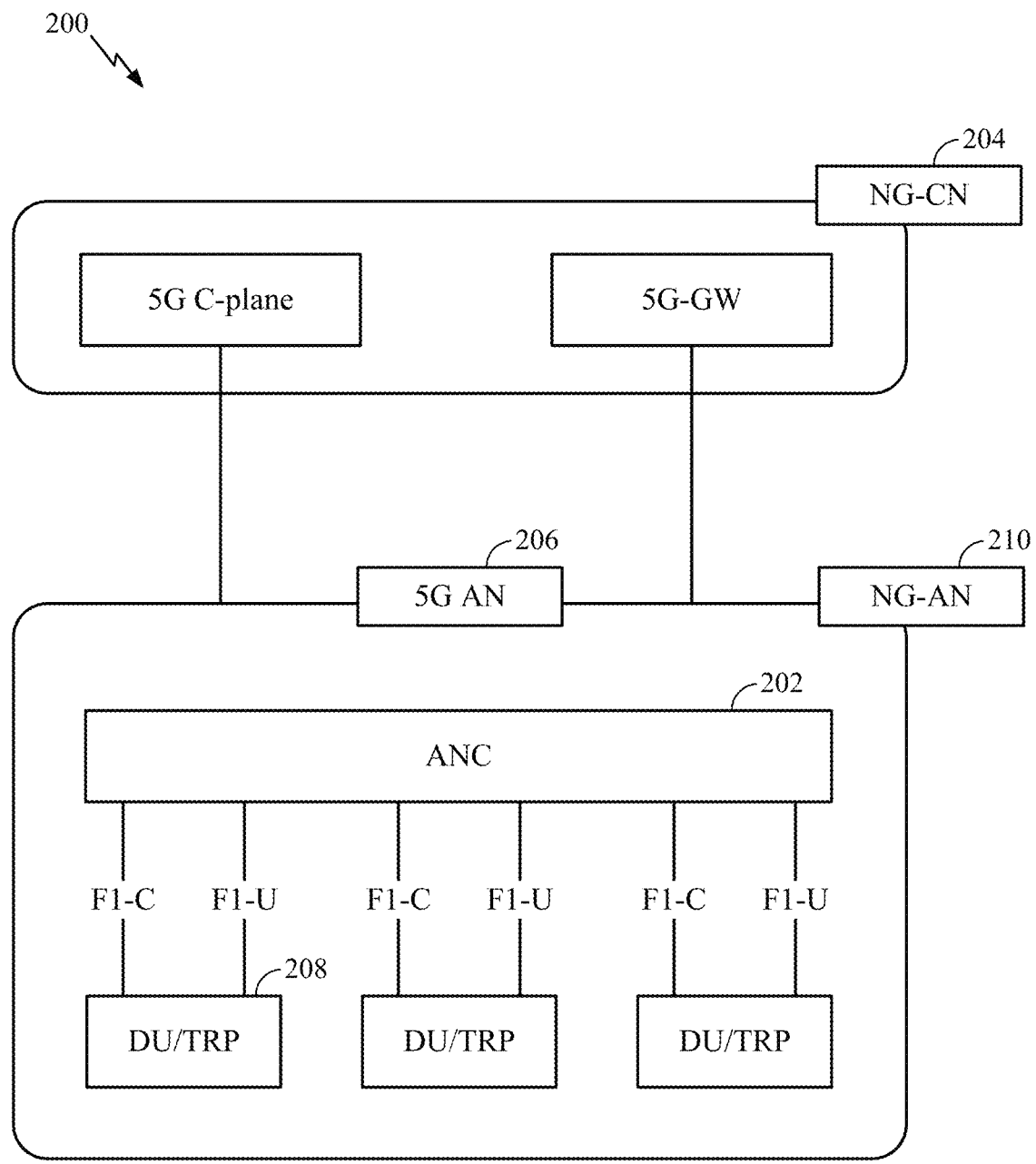
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU) or a remote unit (RU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
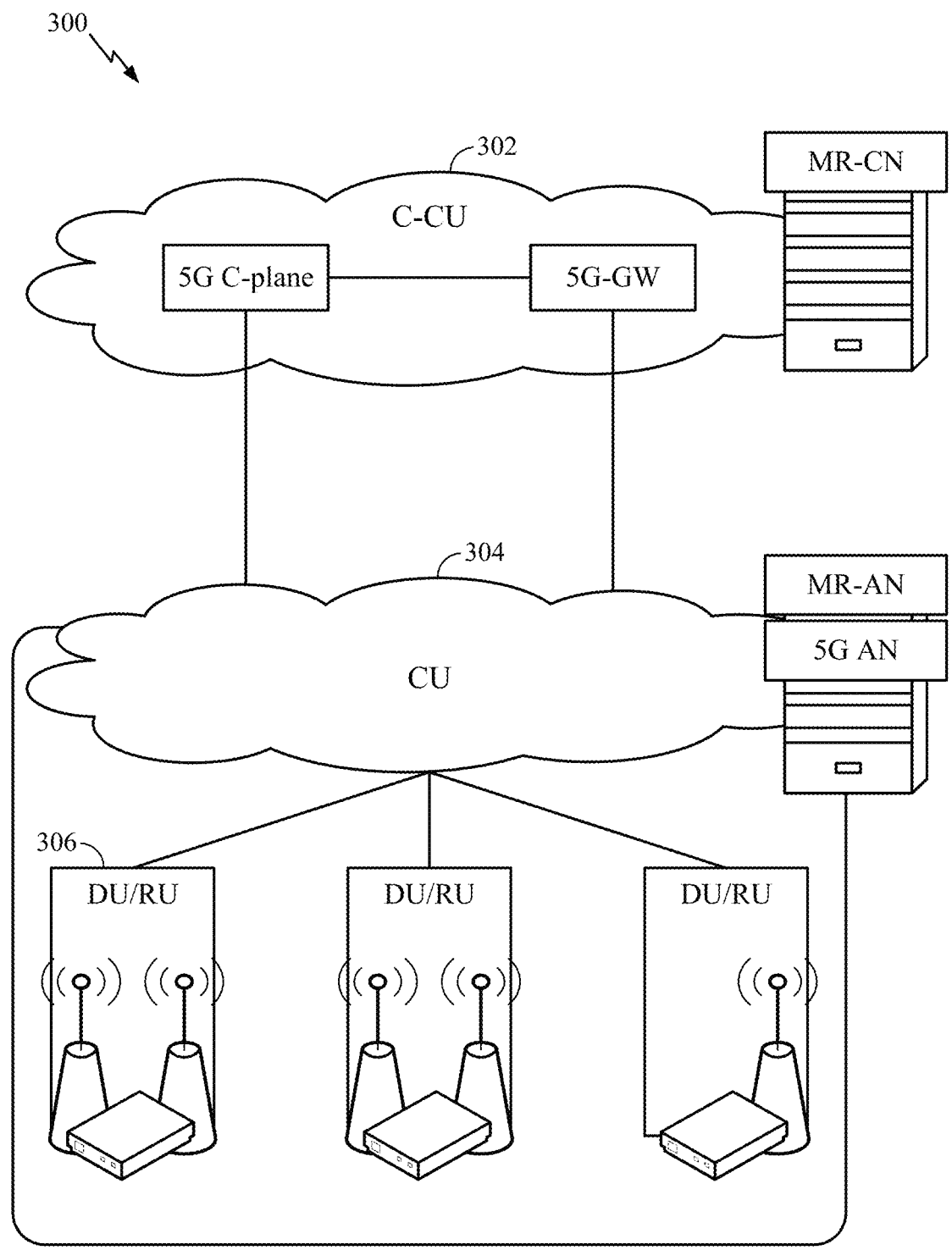
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (CU) 304 may host one or more ANC functions. Optionally, the CU 304 may host core network functions locally. The CU 304 may have distributed deployment. The CU 304 may be close to the network edge.

A DU/RU 306 may host one or more TRPs (Edge Node (EN), an Edge Unit (EU), a Radio Head (RH), a Smart Radio Head (SRH), or the like). The DU/RU may be located at edges of the network with radio frequency (RF) functionality.

Figure 4:
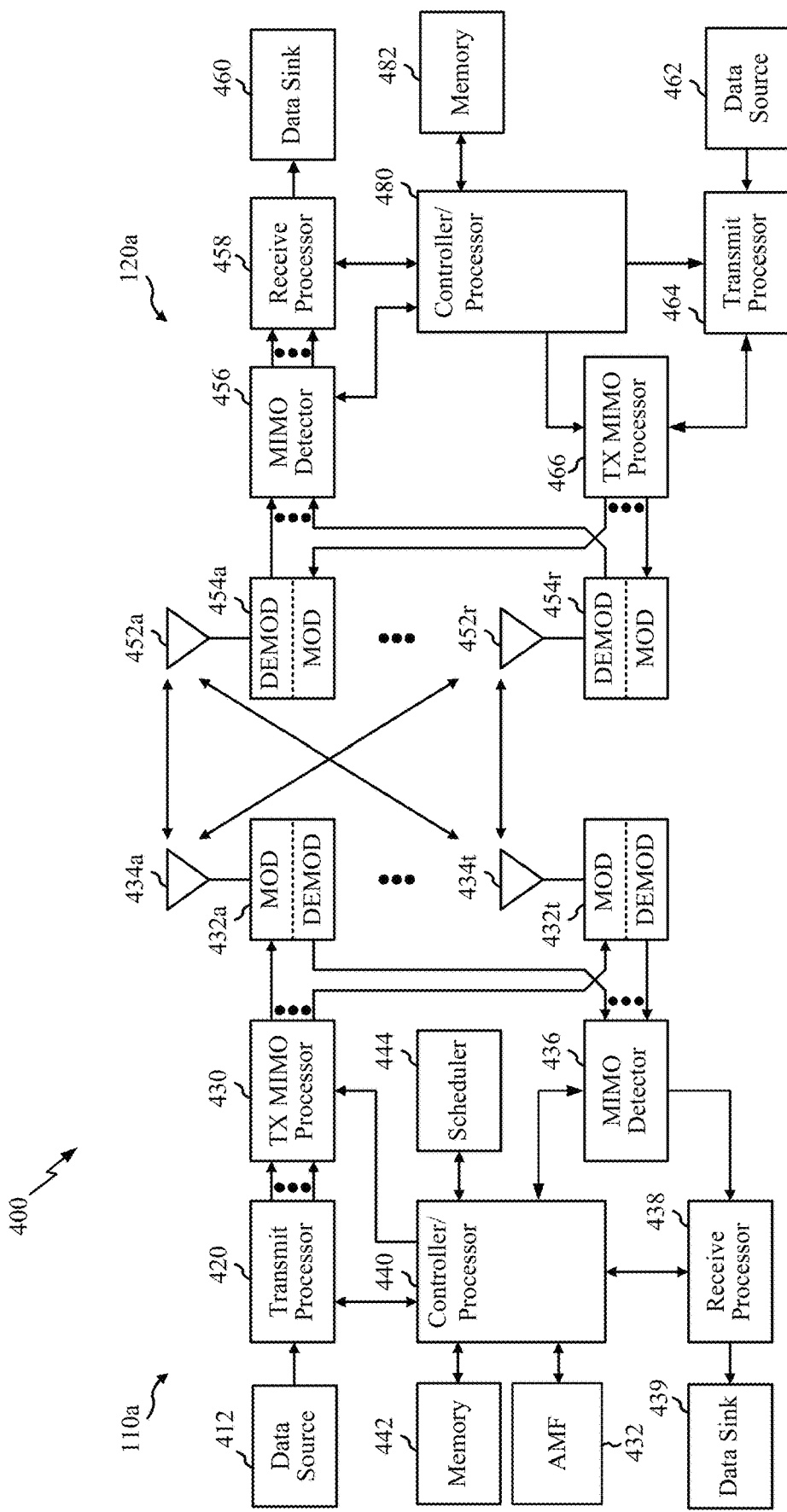
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein with reference to FIGS. 8 and 10. While not shown, an RSU may include similar components (controllers, processors, and/or antennas) configured to perform operations 1000 of FIG. 9.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. For example, the controller/processor 440 of the BS 110a may be configured to perform operations 900 of FIG. 9 (e.g., if performing as an RSU) and/or operations 1000 of FIG. 10, according to aspects described herein. Similarly, the controller/processor 480 of the UE 120a may be configured to perform operations 800 of FIG. 8. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5:
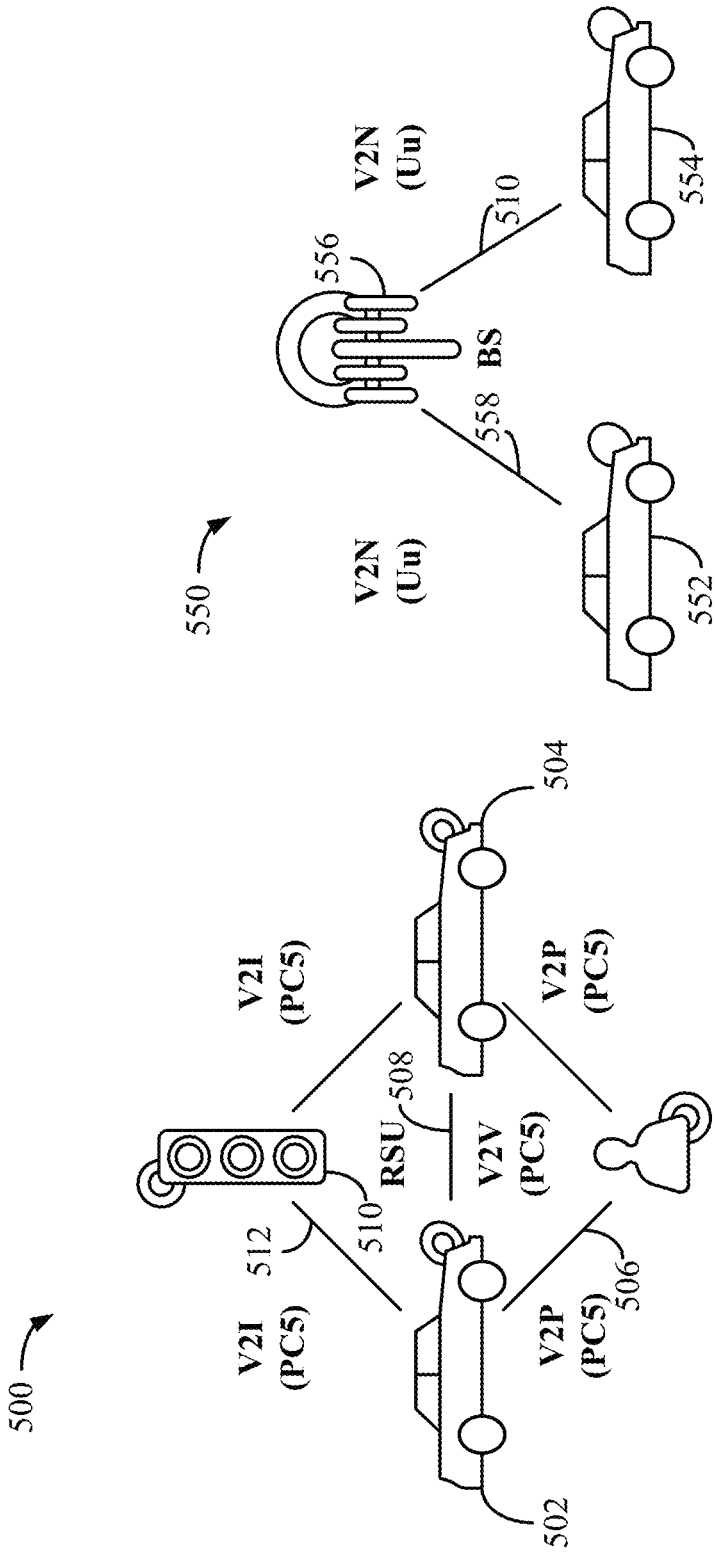
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

Example Sidelink Assisted Cellular Operation Optimization

Aspects of the present disclosure provide apparatus, methods, processing systems, and computer readable mediums for using information related to a sidelink to optimize operation on a cellular link.

As will be described in greater detail below, using a V2X ID of a UE (or a device associated with the UE, such as a vehicle), a base station (e.g., a gNB) may obtain information about the UE from a wireless node, such as an RSU. The information, for example, may include speed, location, and/or path information for the UE (or a vehicle containing the UE). The base station may use this information to help optimize cellular communications with the UE, for example, to adjust beams used for communications between the base station and the UE. Hence, the techniques described herein may be considered a form of cross RAT assistance for cellular link (Uu) optimization. In some aspects, the V2X ID may be a general Application Layer Identifier used for a sidelink communication between the UE and a wireless node, or the V2X ID can be a lower layer identifier, e.g. the Layer-2 ID used at MAC layer.

Figure 6:
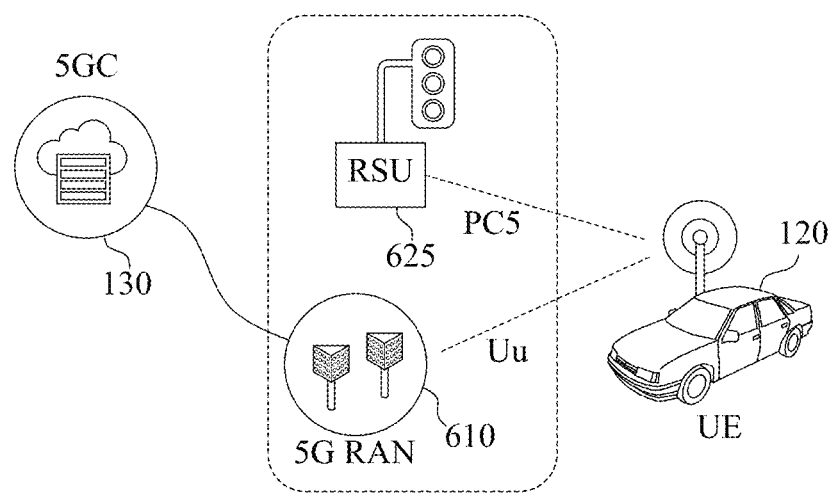
FIG. 6 illustrates an example deployment scenario for a co-located microcell and roadside unit (RSU), in accordance with certain aspects of the present disclosure.

As illustrated in FIG. 6, new business developments have introduced new deployment options to allow collocated V2X Road Side Unit (RSU) 625 and Uu base stations 610 (e.g., gNB of a 5G RAN in communication with a 5G core network 130). For example, a collocated RSU and cellular base station may be deployed by a government agency working with mobile network operators (MNOs) and/or independent radio network operators on traffic lights to help support safety and autonomous driving efforts.

This provides opportunities for the cross-RAT enhancements described herein, as the V2X RSU 625 may provide additional information that is usually not available via the Uu (cellular) link. In order to create a cross-RAT relationship, a mechanism is provided herein to link the ID of the vehicle in the V2X communication (e.g., a V2X ID) with a Uu identity of the UE, such as a radio network temporary identifier (RNTI). In some cases, the gNB may be disaggregated and the interaction between the V2X RSU and gNB may happen at different logical layers. In some aspects, the V2X ID can be the V2X Application Layer ID, e.g. the temporary ID or station ID, used in the V2X application layer messages.

Aspects of the present disclosure provide for enhanced Uu signaling, so that the UE could indicate its V2X ID to the gNB. This V2X ID can be used for obtaining information from the messages received over V2X link (sidelink or PC5) to help optimize Uu operations. Aspects of the present disclosure allow the integration of inputs from multiple PC5 termination points (e.g. RSUs), or from network function (NF) to facilitate mobility support.

As will be described in greater detail below, Uu signaling may be enhanced to allow for a new indication of a UE V2X ID, which may involve utilizing interfaces between the Uu and PC5 components in a disaggregated set up.

In order to create the cross-RAT relationship, the V2X ID may be linked with a Uu UE identity. The gNB may be disaggregated and the interaction between the V2X RSU and gNB may happen at different layers, which provides chances for Uu operation enhancements optimization and enhancements at different layers, using the PC5/V2X assistance, for example, using information that may already gathered via the PC5/V2X interface, such as location, speed, and path information. Therefore, the Uu UE identity can be the identify used at different layers of the Uu operation, e.g. S-TMSI, 5G-GUTI, or C-RNTI, etc., depending on which layer the optimization is carried out.

Aspects of the present disclosure provide options that allow different integration of PC5/V2X information to enhance the Uu operations. As one example, Uu beam management can utilize the location information to estimate the corresponding adjustments to beams used for communicating on the Uu link (e.g., as conveyed via transmission configuration information (TCI) states with spatial information.

Figure 7:
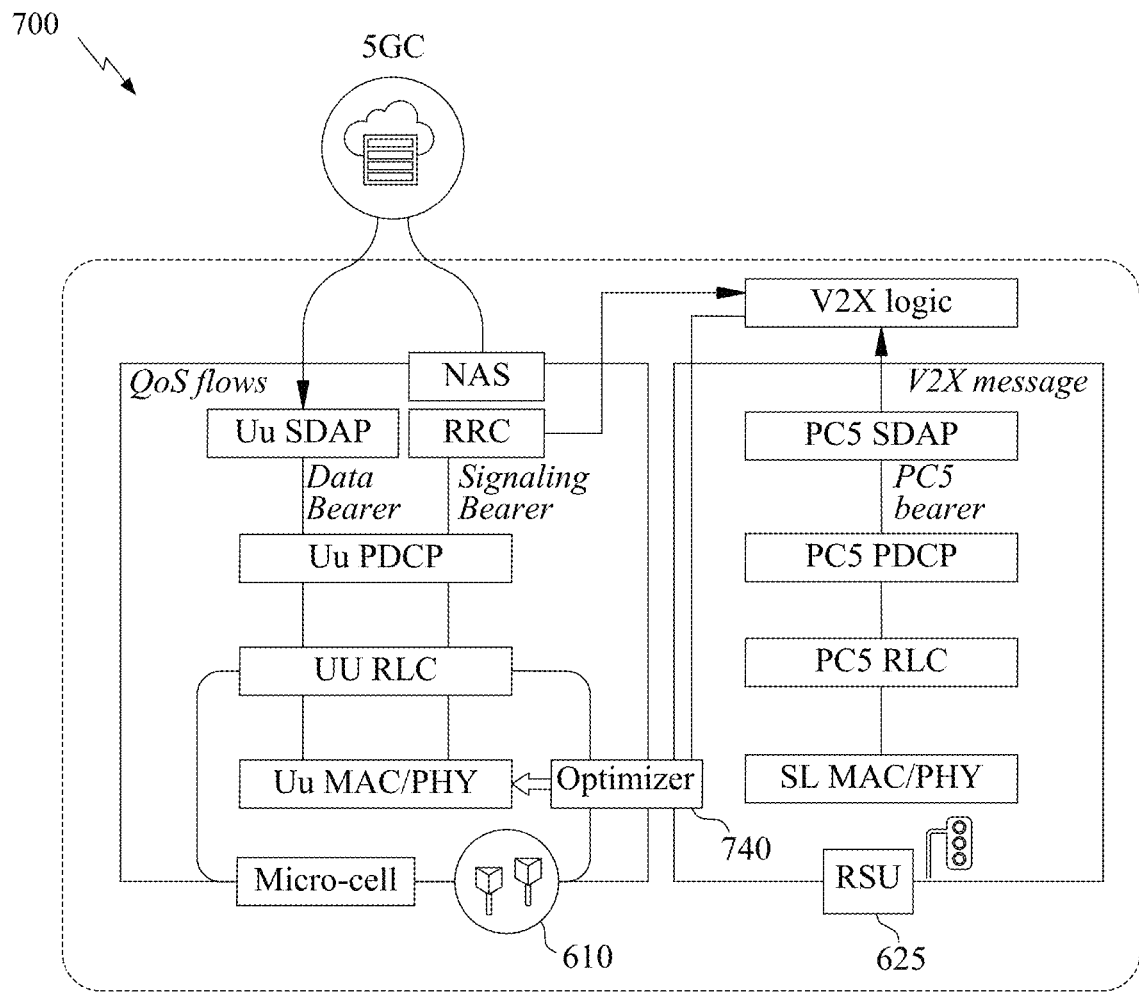
FIG. 7 illustrates an example multiple radio access technology (multi-RAT) architecture, in accordance with certain aspects of the present disclosure.

FIG. 7 illustrates an example multiple radio access technology (multi-RAT) architecture 700, in which V2X layer information may be available at different levels than the Uu control function. For example, the UE location, velocity, direction, and path information may be available from application layer of the V2X communication or sidelink communication, while the Uu side operation management is typically at a lower layer, such as a physical (PHY) and/or medium access control (MAC) layer for beam management.

Aspects of the present disclosure may be implemented as an optimizer component 740 that may help create a proper linkage between the PC5/V2X/Sidelink information and the Uu connection management for the UE.

In some cases, the Uu component of the UE may be (located physically) different from that of the PC5/V2X logic. For example, the Uu component may be a mobile phone in a vehicle, while the PC5/V2X part can be the vehicle telematics modem (and the mobile phone and telematics modem may communicate, for example, via Bluetooth, WiFi/WLAN connection, or a wired connection).

In other cases, the Uu and PC5/V2X components may be the same (implemented in a same device). This may be the case, for example, for a drone, where the drone would have both Uu components (e.g., for network connectivity for flight management) and PC5 (e.g., for Broadcast Remote ID transmission).

Whether the Uu and PC5/V2X functionality is separate or implemented in the same device, aspects of the present disclosure allow for the association of a V2X ID and Uu UE ID to allow for optimization of Uu operation using information obtained from or derived from the sidelink communication.

Figure 8:
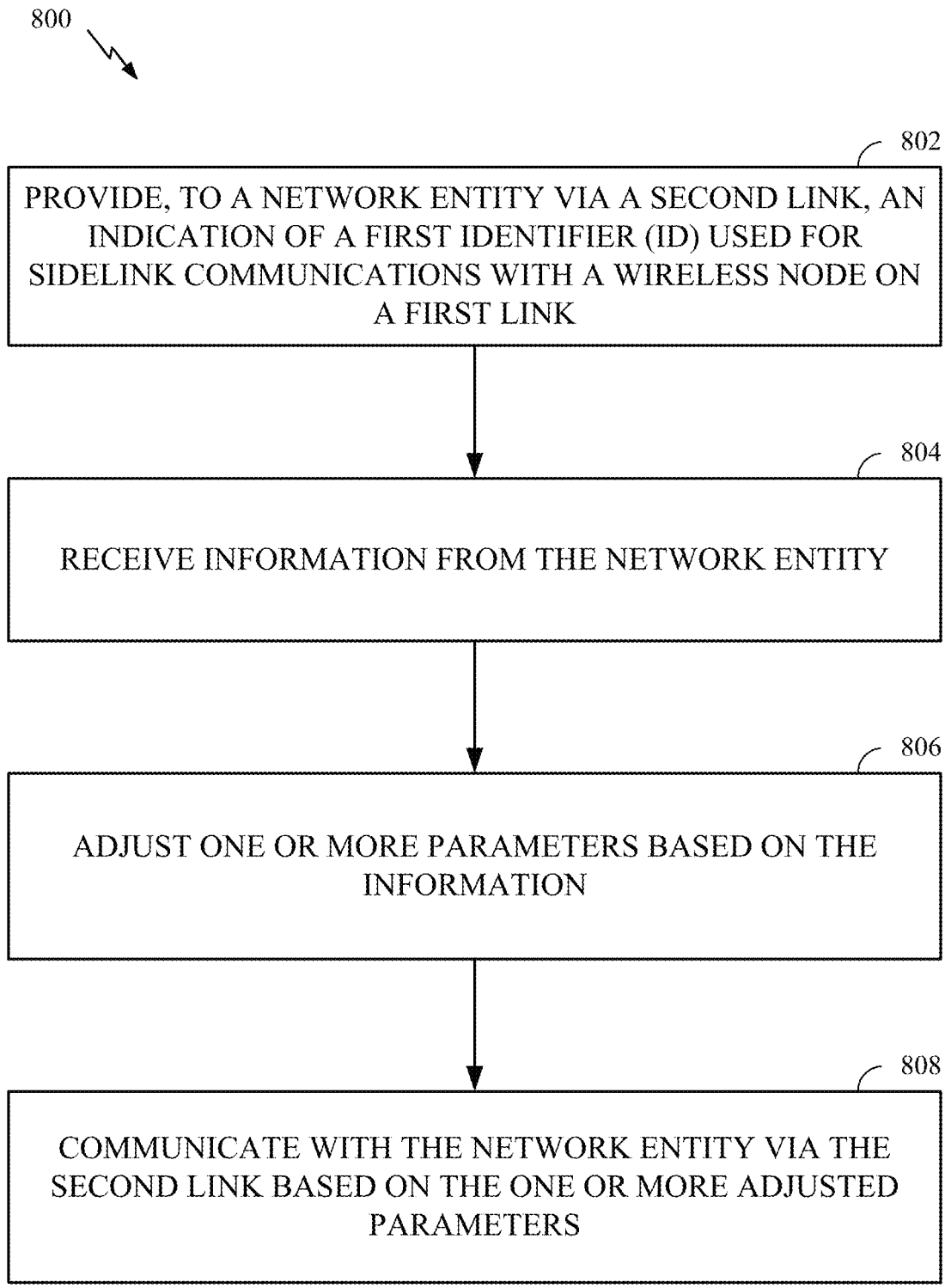
FIG. 8 illustrates example operations for wireless communications by a UE, in accordance with certain aspects of the present disclosure.
Figure 9:
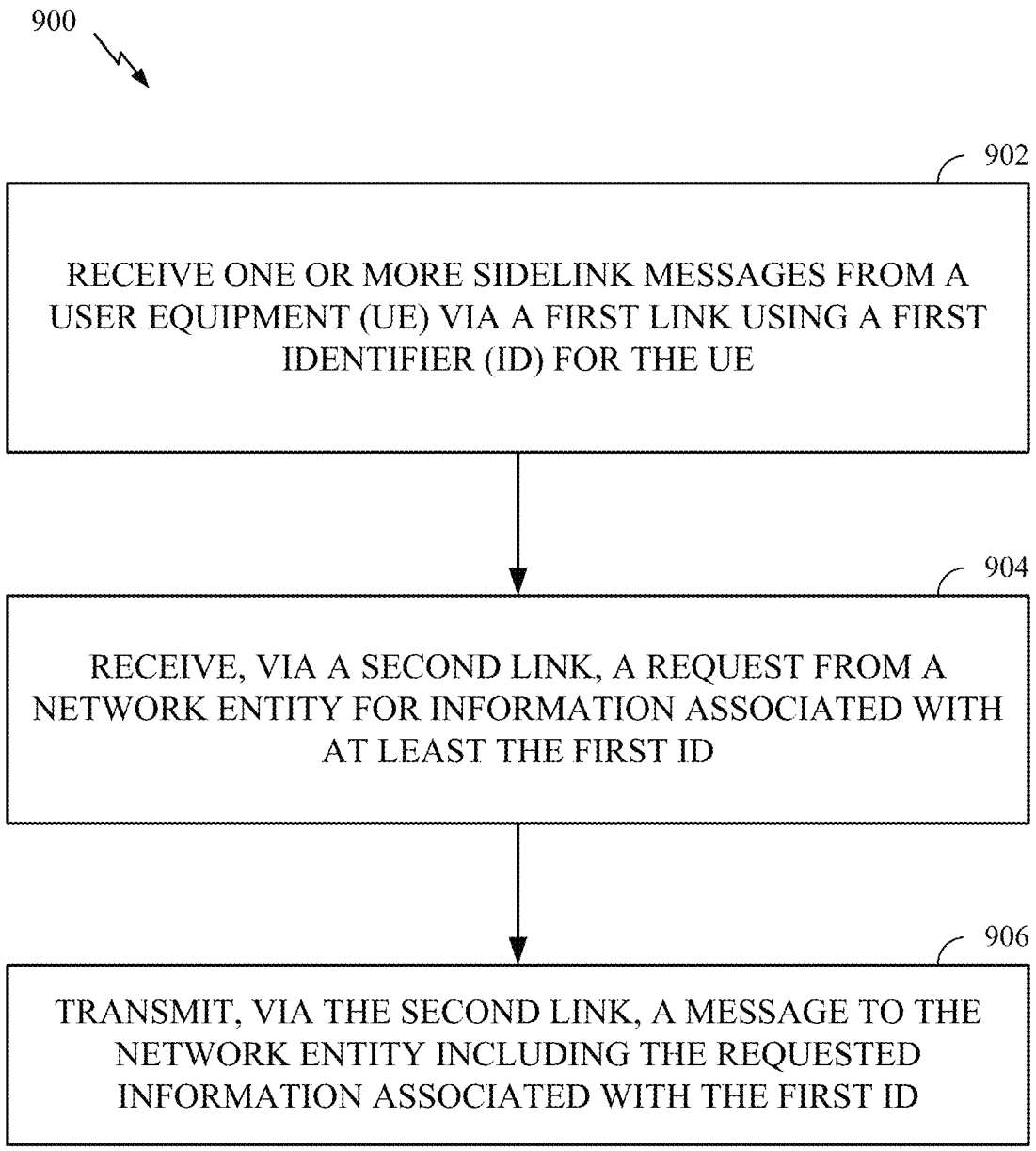
FIG. 9 illustrates example operations for wireless communications by an RSU, in accordance with certain aspects of the present disclosure.
Figure 10:
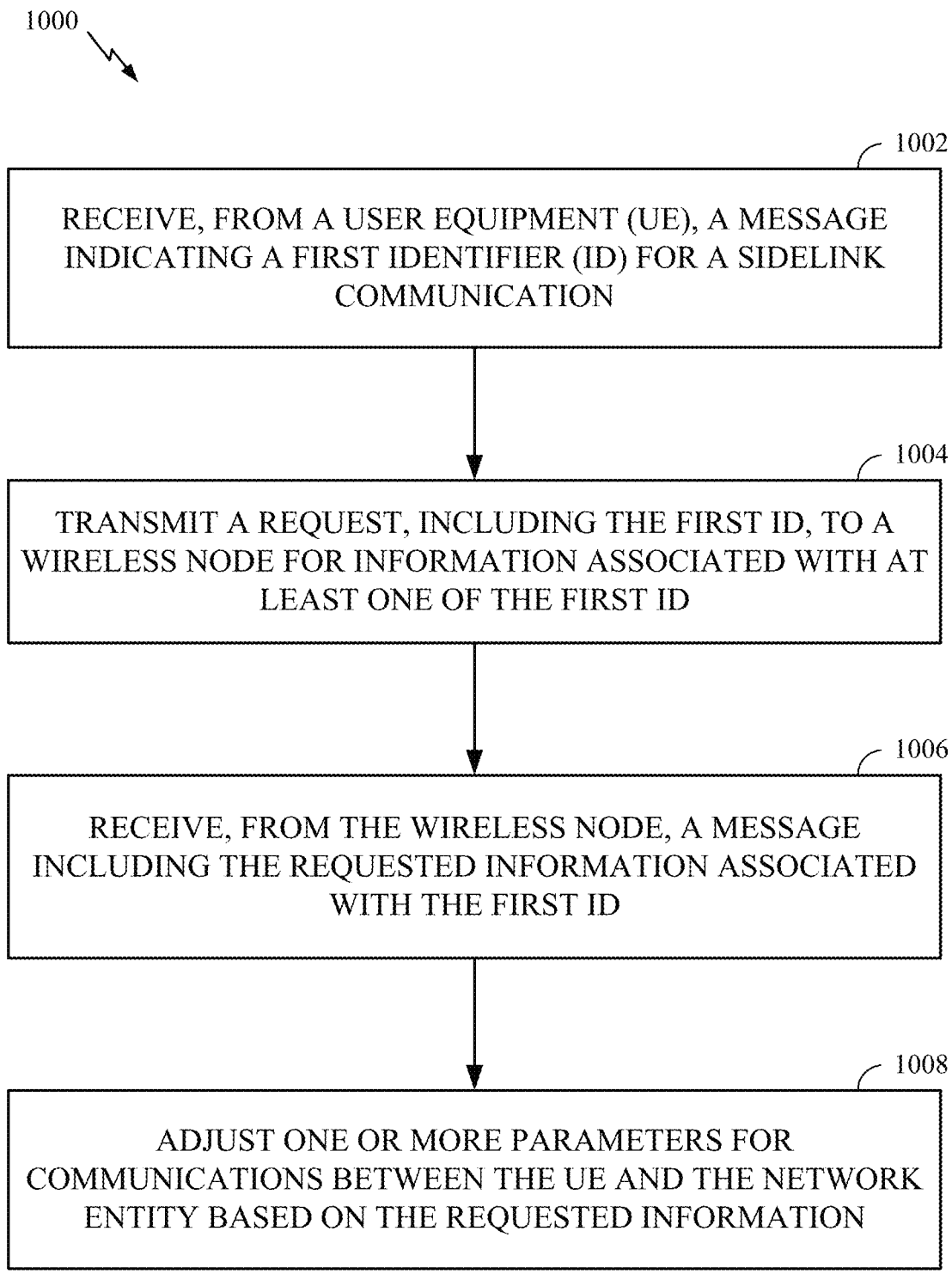
FIG. 10 illustrates example operations for wireless communications by a network entity, in accordance with certain aspects of the present disclosure.

FIGS. 8, 9, and 10 illustrate operations from the perspective of a UE, RSU, and network (e.g., gNB), respectively. These interaction of these different components when performing these operations may be understood with reference to the call flow diagram shown in FIG. 11.

FIG. 8 illustrates example operations 800 for wireless communications by a UE. For example, operations 800 may be performed by a UE 120 shown in FIG. 1, FIG. 4, or FIG. 11. Operations 800 may be implemented as software components that are executed and run on one or more processors (e.g., controller/processor 480 of UE 120 shown in FIG. 4). Further, the transmission and reception of signals by the UE in operations 800 may be enabled, for example, by one or more antennas (e.g., antennas 452 of FIG. 4). In certain aspects, the transmission and/or reception of signals by the UE may be implemented via a bus interface of one or more processors (e.g., controller/processor 480 of FIG. 4) obtaining and/or outputting signals exchanged between MAC and PHY layers.

Operations 800 begin, at 802, by providing, to a network entity via a second link, an indication of a first identifier (ID) used for sidelink communications with a wireless node on a first link.

For example, the UE may provide a V2X ID via the Uu link to the gNB. This can be achieved by sending a RRC message to the gNB by the UE, e.g. UE Assistance Information message, that contains the V2X ID and an indication that the cross-RAT assistance is required or supported. The gNB, in turn, may create an association between the V2X ID and Uu UE ID (e.g., RNTI, S-TMSI, 5G GUTI, etc.). In some cases, the Uu component of the UE (e.g., an RRC module), may obtain the V2X/PC5 ID from the V2X component that can be used for association. Such an ID may be obtained via different local mechanisms, for example, such an ID may be shared from a vehicle to UE via a Bluetooth profile, may be manually entered by a user, or obtained via a quick response (QR) code. Depending on the implementation and scenario, the V2X/PC5 ID can be, for example, a V2X/PC5 Application Layer ID or Layer 2 ID (e.g., depending on which layer's information is to be used for optimization).

The Uu component may send the V2X/PC5 ID to the gNB to create the association. In some cases, the gNB may further request the related assistance information from the RSU about the V2X/PC5. The gNB may authorize the request based on the subscription of the UE and security information provided. The security information may be associated with the V2X/PC5 ID and provided to the gNB by the UE via the Uu signaling, e.g. the RRC message. For example, the security information may be based on certificates associated with basic safety messages (BSM messages used in V2X broadcast) sent over the V2X/PC5 link. Upon receiving the request, the RSU may provide the related information to the gNB for Uu link management. This information could for example be the location information, speed information, or the path plan information associated with the V2X/PC5 ID, which is derived from the V2X/Sidelink communication the RSU received. Using such information, the gNB would be able to derive for example the relative position, direction, or distance of the UE from itself. Therefore, corresponding Uu operation management can be carried out. For example, the gNB can adjust the beam management based on the relative location and angels, and it may also perform certain range control or power management based on the relative distances.

At 804, the UE receives information from the network entity. Such information would indicate how the UE should adjust its Uu operations. For example, this can be sent via a RRCReconfiguration message. At 806, the UE adjusts one or more parameters based on the information. At 808, the UE communicates with the network entity via the second link based on the one or more adjusted parameters.

For example, the information may include information for Uu link management, such as updated beam information for communications on the Uu link.

FIG. 9 illustrates example operations 900 for wireless communications by a wireless device. For example, operations 900 may be performed by an RSU shown in FIG. 1 or FIG. 11. Operations 900 may be implemented as software components that are executed and run on one or more processors (e.g., controller/processor 480 of UE 120 shown in FIG. 4). Further, the transmission and reception of signals by the wireless device may be enabled, for example, by one or more antennas. In certain aspects, the transmission and/or reception of signals by the wireless node may be implemented via a bus interface of one or more processors obtaining and/or outputting signals exchanged between MAC and PHY layers.

Operations 900 begin, at 902, by receiving one or more sidelink messages from a user equipment (UE) via a first link using a first identifier (ID) for the UE. At 904, the RSU receives, via a second link, a request from a network entity for information associated with at least the first ID. At 906, the RSU transmits, via the second link, a message to the network entity including the requested information associated with the first ID.

FIG. 10 illustrates example operations 1000 for wireless communications by a network entity. For example, operations 1000 may be performed by a BS 120 (e.g., a gNB) shown in FIG. 1, FIG. 4, or FIG. 11. Operations 1000 may be implemented as software components that are executed and run on one or more processors (e.g., controller/processor 440 of BS 110 shown in FIG. 4). Further, the transmission and reception of signals by the network entity in operations 1000 may be enabled, for example, by one or more antennas (e.g., antennas 434 of FIG. 4). In certain aspects, the transmission and/or reception of signals by the network entity may be implemented via a bus interface of one or more processors (e.g., controller/processor 440 of FIG. 4) obtaining and/or outputting signals exchanged between MAC and PHY layers.

Operations 1000 begin, at 1002, by receiving, from a user equipment (UE), a message indicating a first identifier (ID) for a sidelink communication. At 1004, the network entity transmits a request, including the first ID, to a wireless node for information associated with at least one of the first ID. At 1006, the network entity receives, from the wireless node, a message including the requested information associated with the first ID. At 1008, the network entity adjusts one or more parameters for communications between the UE and the network entity based on the requested information.

Figure 11:
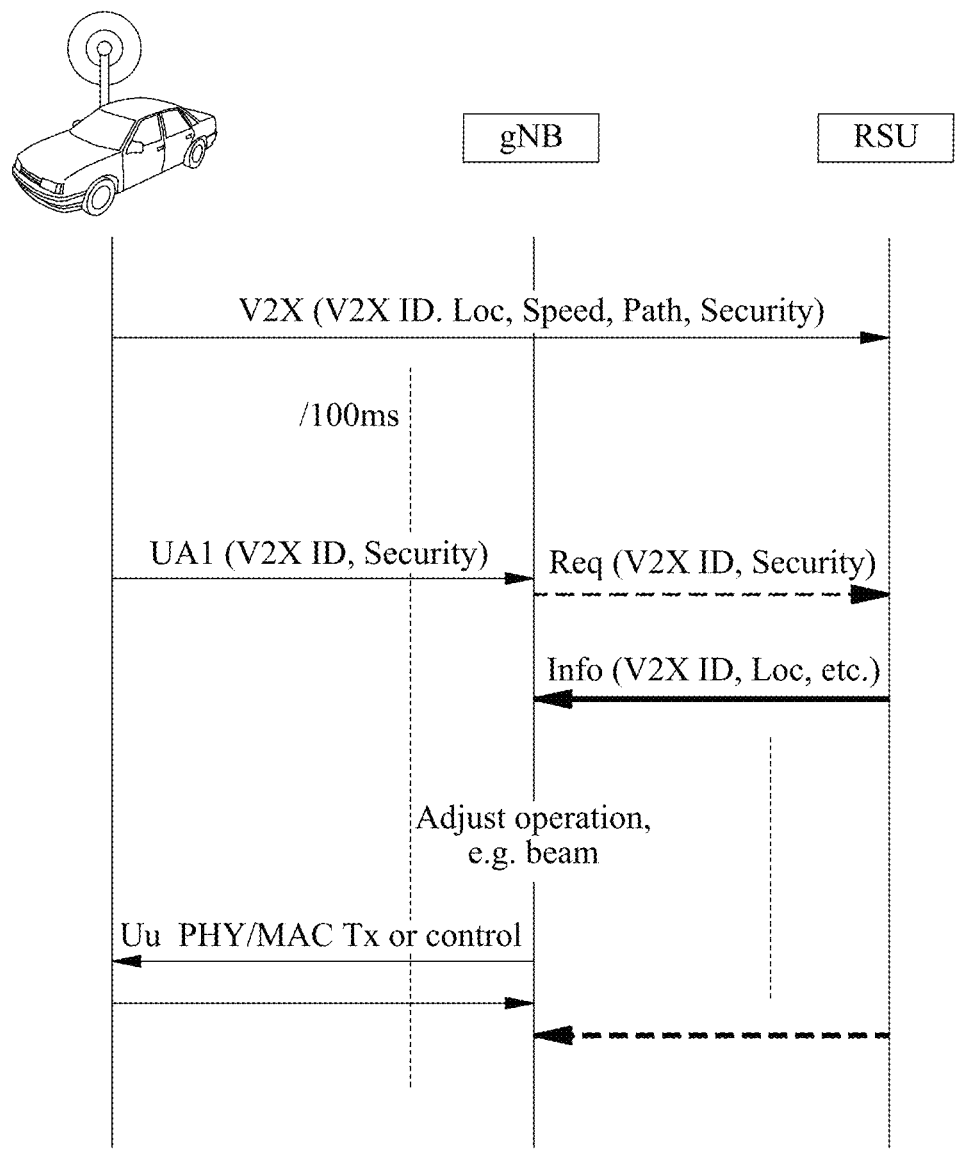
FIG. 11 illustrates an example call flow diagram illustrating sidelink assisted cellular operation optimization, in accordance with certain aspects of the present disclosure.

As noted above, operations of FIGS. 8-10 may be understood with reference to FIG. 11, which illustrates an example call flow diagram illustrating sidelink assisted cellular operation optimization, in accordance with certain aspects of the present disclosure. In some cases, the gNB and RSU may be collocated (e.g., as shown in FIG. 6). Further, while vehicles are shown, the same or similar operations may involve other types of devices including or associated with a V2X UE.

As illustrated, the RSU may receive V2X messages from vehicles (e.g., from UEs of the vehicles and/or inside the vehicles). These V2X messages may include various information, for example, a V2X App Layer ID, location information, speed information, path planning information, and security information. In some cases, such information may be based on BSMs sent periodically (e.g., every 100 ms).

In some cases, the UE (of the vehicle or inside the vehicle) requests optimization (explicitly or implicitly) by providing UE Assistance Information (UAI) to the gNB. The UAI may include, for example, the V2X App Layer ID of the vehicle and the security information. The security information may be derived from the security certificates used for the V2X communication. This allows a verification of the validity of the request at the gNB or RSU of the request from the UE. For example, the RSU would have the certificate information obtained from the V2X communication. When the UE sends the request over Uu, it can include a signature of the V2X ID using the certificate. The gNB will forward both the V2X ID and the signature to the RSU. This way, the RSU can verify that this request is sent from a legitimate user that owns the V2X ID. To avoid any replay attack, timestamp can be also included into the request for verification purpose.

As illustrated, the gNB may request corresponding information from the RSU (which may be collocated as noted above), by using this V2X ID and security information. In response to this request, the RSU may start to provide the requested information to the gNB for Uu operation optimization. In some cases, the RSU may filter the information (e.g., by averaging or some other type of processing). In some other aspects, the RSU could continue to provide and update the gNB of the information frequently, e.g. every 100 ms, based on the newly received messages. This can last until a pre-configured time period, or until the gNB sends a request to stop the information feeding (e.g. when the UE moves out of the gNB coverage). Alternatively, the gNB may indicate in the request a timer, and RSU will continue to provide the information until the timer expires.

The gNB may then start to perform Uu operation control, based on the information provided by the RSU. For example, the Uu may perform beam management based on the location information. For example, the gNB may select optimal beams for a current location of the UE or a future location of the UE predicted based on a current location, speed, and path information. The RSU may also provide additional information regarding the UE to the gNB for optimization, for example, if there are other vehicles in between the UE and the gNB. This way, the gNB may be able to predict certain beam blockage and could use a different strategy for the corresponding time period. For this, the gNB may also need to provide its own location to the RSU in the request.

Figure 12:
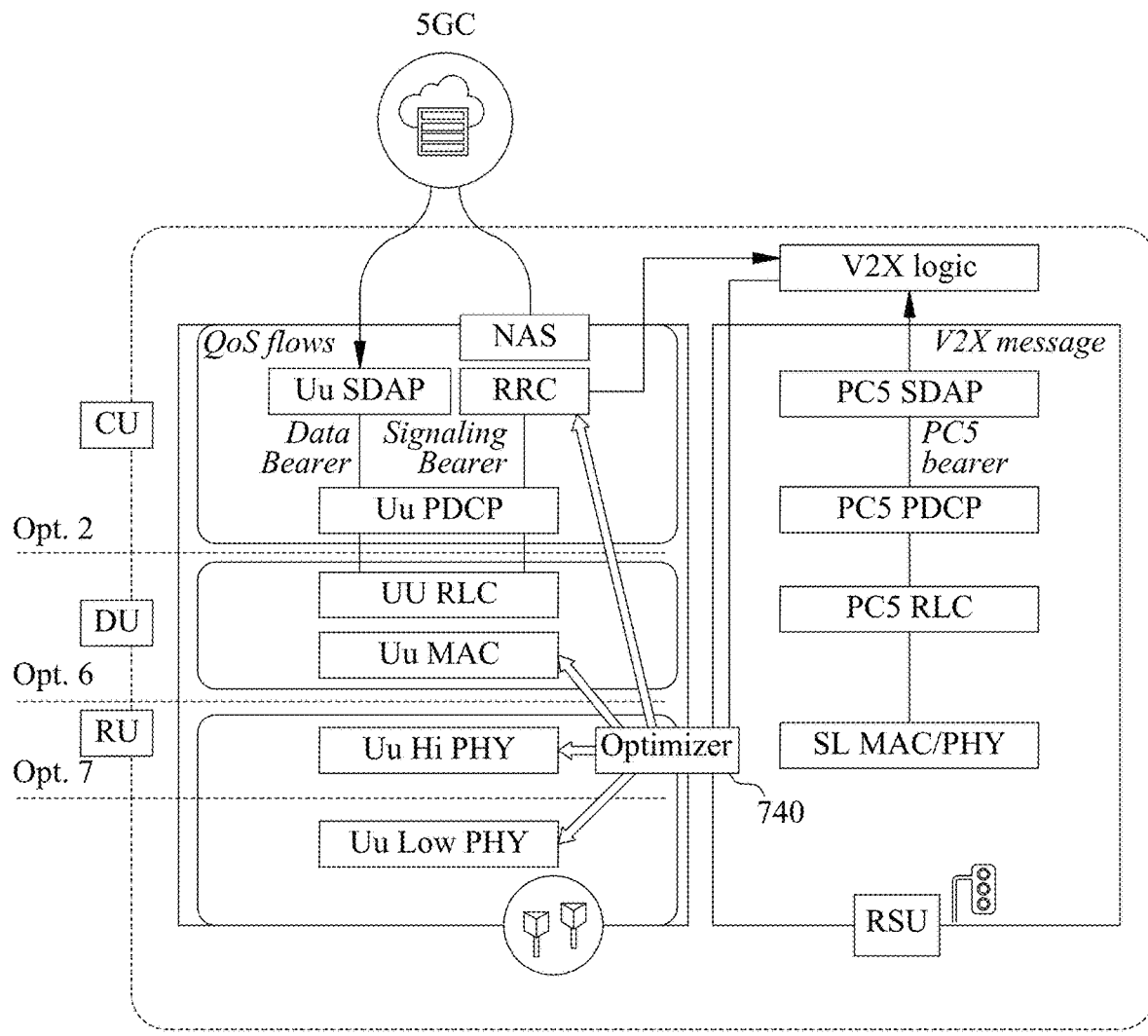
FIG. 12 illustrates an example multiple radio access technology (multi-RAT) architecture, in accordance with certain aspects of the present disclosure.

Aspects of the present disclosure may provide further enhancements to support a disaggregated RAN architecture, such as that shown in FIG. 12. In a disaggregated RAN architecture, there may be various options for splitting functionality of Uu base stations between central units (CUs), distributed units (DUs), and remote units (RUs). Examples of such options include a CU-DU split (labeled as option 2 in FIG. 12) and a CU-DU-RU split (referred to as options 6 and 7 in FIG. 12). As shown in FIG. 12, to enhance Uu operation based on sidelink information, the optimizer 740 may interact with different functional units, depending on the splitting option.

In such cases, the RSU may not be collocated with the CU, or even the DU. Rather, the RSU may be only co-related with the RU. Therefore, it may be useful for the UE to indicate the relevant location of the RSU (such as an address), so that the CU (which terminates the RRC signaling) can access the corresponding RSU.

In some cases, this may be achieved by having the UE also provide a Zone ID of the RSU that is used in V2X/PC5 communications. In some cases, the UE may include the Zone ID in the Uu request (e.g., in the UAI) in which the V2X ID (and possibly the security information) is provided. The Zone ID used by V2X can roughly indicate the area of the UE, which may allow the CU to locate the corresponding RSU (e.g., to identify an address used to access the RSU). In other cases, the RSU ID could be provided based on the V2X message the UE received over the PC5/V2X communication. The gNB/CU may resolve the actual network address of the RSU via resolving the RSU ID.

To enable this optimization, the CU may also provide the Uu ID (e.g. RNTI) or the cell ID, or the DU/RU ID, etc., to the V2X logic, so that RSU (via optimizer 740) can provides information directly to an RU or DU, without going through CU.

Figure 13:
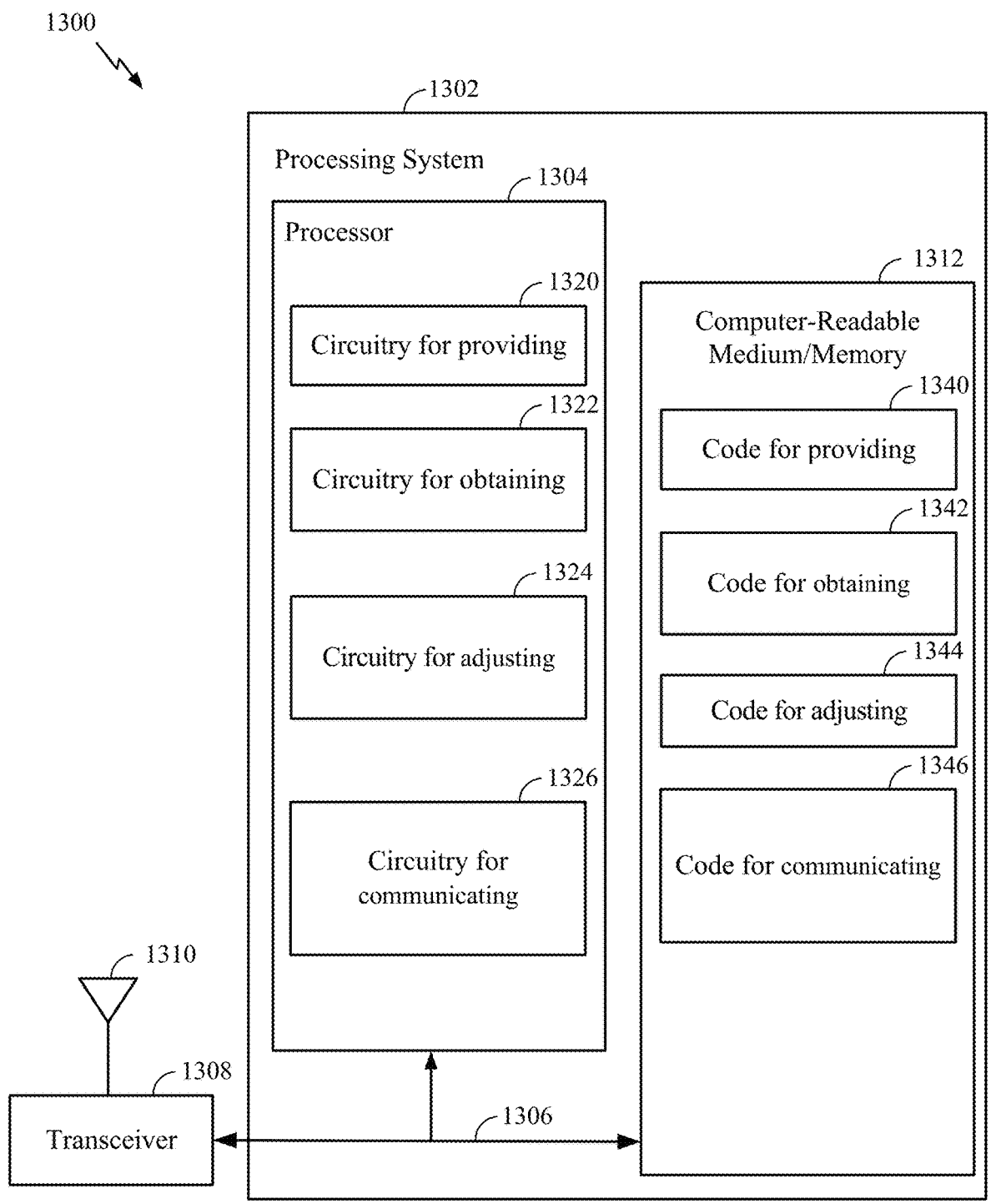
FIG. 13 illustrates a communications device that may include various components configured to perform operations for the techniques disclosed herein in accordance with aspects of the present disclosure.

FIG. 13 illustrates a communications device 1300 (e.g., a UE) that may include various components (e.g., corresponding to means-plus-function components) configured to perform operations for the techniques disclosed herein, such as the operations illustrated in FIG. 8. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 8, or other operations for performing the various techniques discussed herein. In certain aspects, computer-readable medium/memory 1312 stores code 1340 for providing, code 1342 for obtaining, code 1344 for adjusting, and code 1346 for communicating. In certain aspects, the processor 1304 has circuitry configured to implement the code stored in the computer-readable medium/memory 1312. The processor 1304 includes circuitry 1320 for providing, circuitry 1322 for obtaining, circuitry 1324 for adjusting, and circuitry 1326 for communicating.

Figure 14:
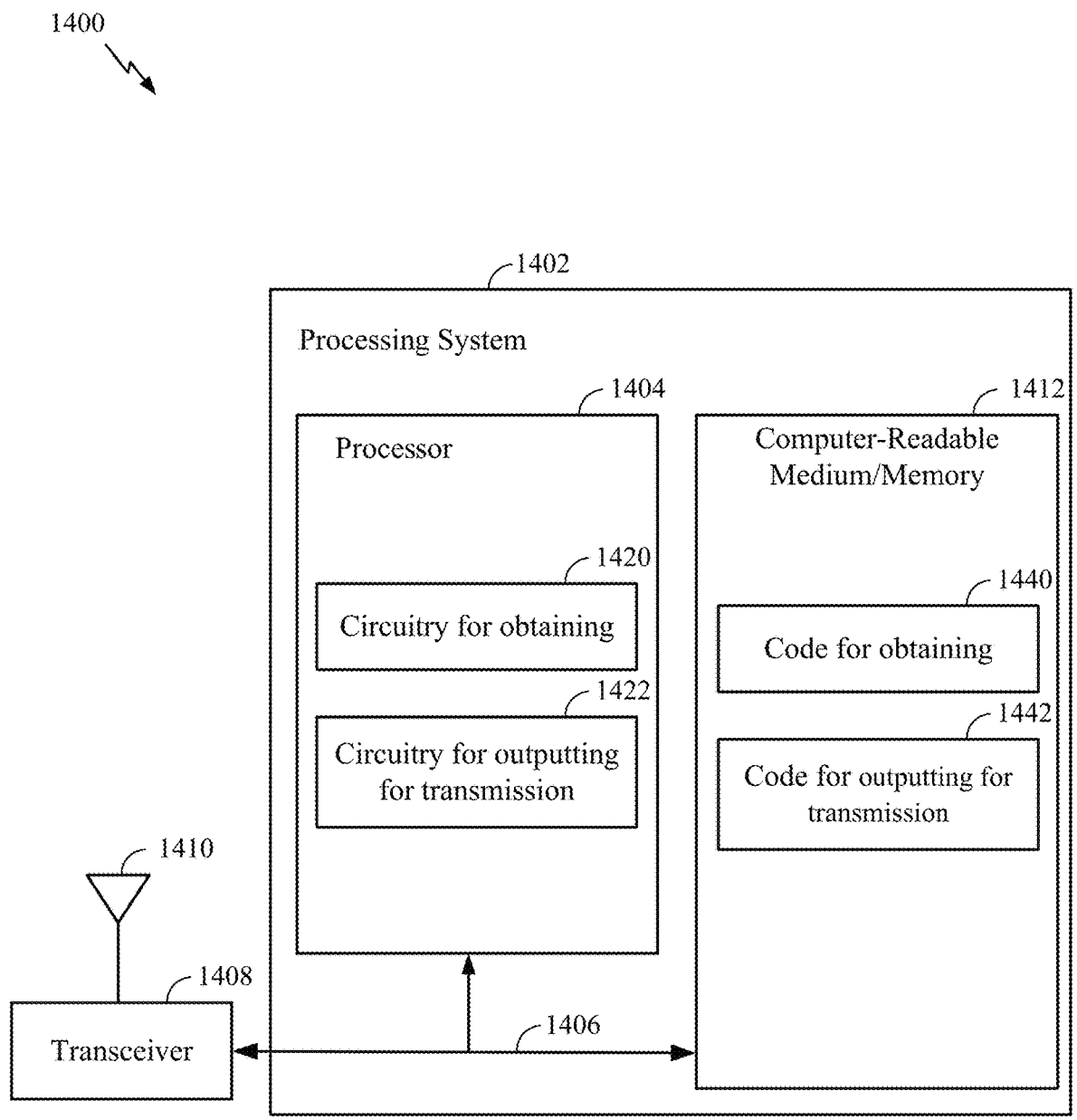
FIG. 14 illustrates a communications device that may include various components configured to perform operations for the techniques disclosed herein in accordance with aspects of the present disclosure.

FIG. 14 illustrates a communications device 1400 (e.g., an RSU) that may include various components (e.g., corresponding to means-plus-function components) configured to perform operations for the techniques disclosed herein, such as the operations illustrated in FIG. 9. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 9, or other operations for performing the various techniques discussed herein. In certain aspects, computer-readable medium/memory 1412 stores code 1440 for obtaining and code 1442 for outputting for transmission. In certain aspects, the processor 1404 has circuitry configured to implement the code stored in the computer-readable medium/memory 1412. The processor 1404 includes circuitry 1420 for obtaining and circuitry 1422 for outputting for transmission.

Figure 15:
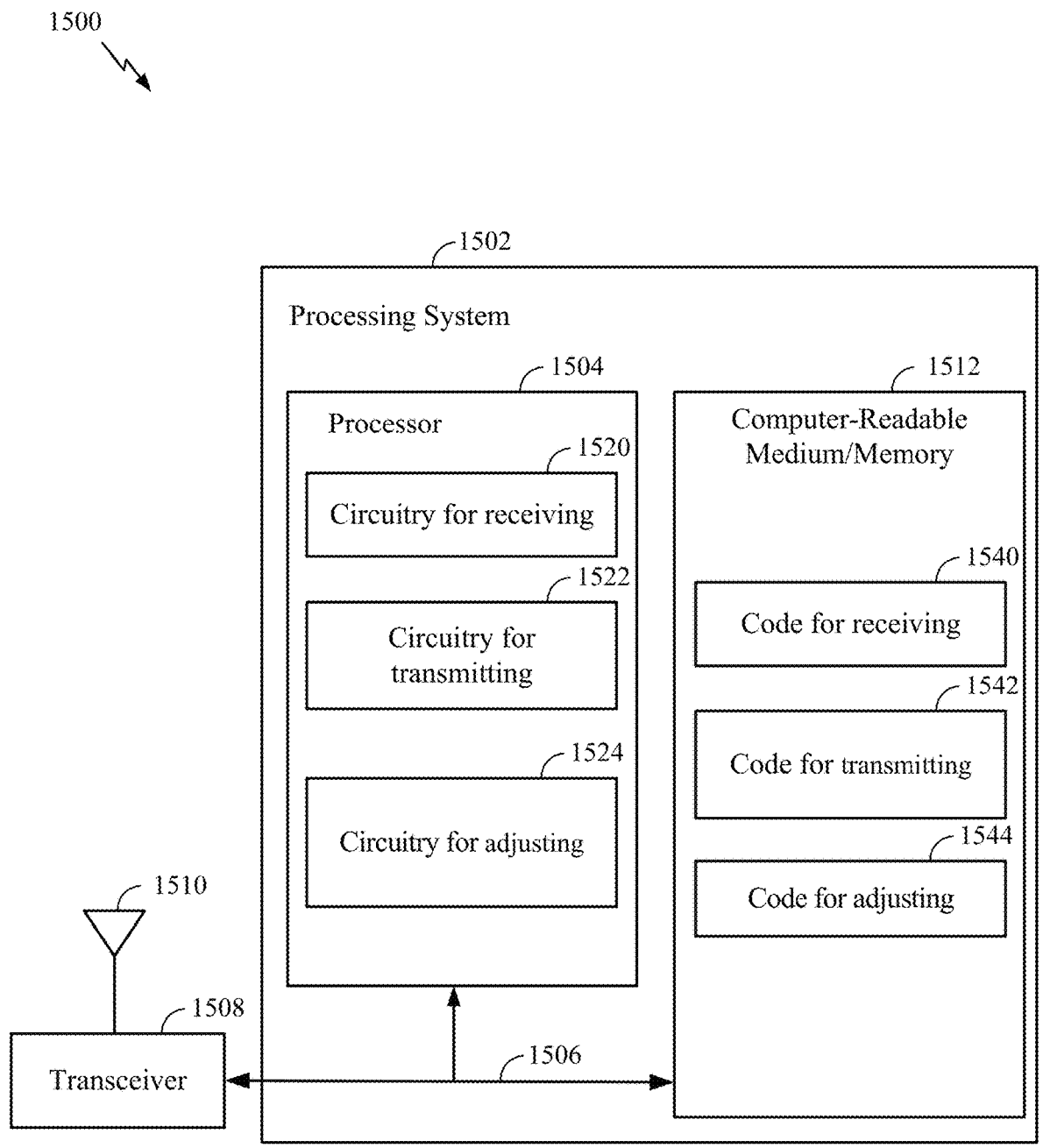
FIG. 15 illustrates a communications device that may include various components configured to perform operations for the techniques disclosed herein in accordance with aspects of the present disclosure.

FIG. 15 illustrates a communications device 1500 (e.g., a network entity) that may include various components (e.g., corresponding to means-plus-function components) configured to perform operations for the techniques disclosed herein, such as the operations illustrated in FIG. 10. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein. In certain aspects, computer-readable medium/memory 1512 stores code 1540 for receiving, code 1542 for transmitting, and code 1544 for adjusting. In certain aspects, the processor 1504 has circuitry configured to implement the code stored in the computer-readable medium/memory 1512. The processor 1504 includes circuitry 1520 for receiving, circuitry 1522 for transmitting, and circuitry 1524 for adjusting.

Example Aspects

Aspect 1: A method for wireless communications by a user equipment (UE), comprising providing, to a network entity via a second link, an indication of a first identifier (ID) used for sidelink communications with a wireless node on a first link; receiving information from the network entity; adjusting one or more parameters based on the information; and communicating with the network entity via the second link based on the one or more adjusted parameters.

Aspect 2: The method of Aspect 1, wherein the wireless node comprises a roadside unit (RSU).

Aspect 3: The method of any one of Aspects 1-2, wherein the network entity comprises a cellular base station.

Aspect 4: The method of any one of Aspects 1-3, further comprising providing information to the network entity regarding an address of the RSU.

Aspect 5: The method of Aspect 4, wherein the information regarding the address is provided via a zone ID use for the sidelink communication.

Aspect 6: The method of any one of Aspects 1-5, wherein the first ID is provided to the network entity using a radio resource control (RRC) message.

Aspect 7: The method of Aspect 6, wherein the RRC message comprises UE assistance information (UAI).

Aspect 8: The method of any one of Aspects 1-7, wherein the first ID comprises a medium access control (MAC) layer ID or an application layer ID for the sidelink communication.

Aspect 9: The method of any one of Aspects 1-8, wherein the one or more sidelink messages comprise basic safety messages (BSMs).

Aspect 10: The method of any one of Aspects 1-9, further comprising providing security information associated with the first ID, when providing the first ID to the network entity.

Aspect 11: The method of any one of Aspects 1-10, wherein the one or more sidelink messages convey at least one of position, speed, or path information for the UE; and the one or more parameters comprise one or more parameters related to beams used for communication between the UE and network entity.

Aspect 12: The method of any one of Aspects 1-11, wherein the UE is located in or in proximity to a device associated with the sidelink messages.

Aspect 13: The method of Aspect 12, wherein the UE obtains the UE obtains the first ID from the device associated with the sidelink messages via a local wireless connection, from user entry, or from scanning a quick response (QR) code.

Aspect 14: A method for wireless communications by a wireless node, comprising receiving one or more sidelink messages from a user equipment (UE) via a first link using a first identifier (ID) for the UE; receiving, via a second link, a request from a network entity for information associated with at least the first ID; and transmitting, via the second link, a message to the network entity including the requested information associated with the first ID.

Aspect 15: The method of Aspect 14, wherein the wireless node comprises a roadside unit (RSU).

Aspect 16: The method of any one of Aspects 14-15, wherein the network entity comprises a cellular base station.

Aspect 17: The method of any one of Aspects 14-16, wherein the first ID comprises a medium access control (MAC) layer ID or an application layer ID used for sidelink communication.

Aspect 18: The method of any one of Aspects 14-17, wherein the one or more sidelink messages comprise basic safety messages (BSMs).

Aspect 19: The method of any one of Aspects 14-18, wherein the sidelink messages include security information associated with the first ID; and the request received from the network entity also includes the security information.

Aspect 20: The method of any one of Aspects 14-19, wherein the one or more sidelink messages convey at least one of position, speed, or path information for the UE; and the requested information comprises at least one of the position, speed, or path information.

Aspect 21: A method for wireless communications by a network entity, comprising receiving, from a user equipment (UE), a message indicating a first identifier (ID) for a sidelink communication; transmitting a request, including the first ID, to a wireless node for information associated with at least one of the first ID; receiving, from the wireless node, a message including the requested information associated with the first ID; and adjusting one or more parameters for communications between the UE and the network entity based on the requested information.

Aspect 22: The method of Aspect 21, wherein the wireless node comprises a roadside unit (RSU).

Aspect 23: The method of any one of Aspects 21-22, wherein the network entity comprises a cellular base station.

Aspect 24: The method of any one of Aspects 21-23, further comprising receiving, from the UE, information regarding a location of the wireless node.

Aspect 25: The method of any one of Aspects 21-24, wherein the location information is provided via a zone ID associated with the sidelink communication.

Aspect 26: The method of any one of Aspects 21-25, wherein the network entity comprises a central unit; and the method further comprises providing a second ID associated with the UE to at least one of a distributed unit (DU) or remote unit (RU).

Aspect 27: The method of any one of Aspects 21-26, wherein the first ID is received from the UE using a RRC message.

Aspect 28: The method of any one of Aspects 21-27, wherein the first ID comprises a medium access control (MAC) layer ID or an application layer ID.

Aspect 29: The method of any one of Aspects 21-28, wherein the network entity also receives security information when receiving the first ID to the network entity; and the network entity includes the security information when transmitting the request.

Aspect 30: The method of Aspect 29, further comprising authorizing the request, based on at least one of the first ID and security information; and transmitting the request after the authorization.

Aspect 31: The method of any one of Aspects 21-30, wherein the requested information comprises at least one of position, speed, or path information for the UE.

Aspect 32: The method of Aspect 31, wherein the one or more parameters comprise one or more parameters related to beams used for communication between the UE and network entity, adjusted based on at least one of the position, speed, or path information for the UE.

Aspect 33: An apparatus comprising at least one processor and a memory configured to perform operations according to any one of Aspects 1-32.

Aspect 34: An apparatus comprising means for performing operations according to any one of Aspects 1-32.

Aspect 35: A computer readable medium having instructions for performing operations according to any one of Aspects 1-32.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 8-10 may be performed by various processors shown in FIG. 4, such as processors 466, 458, 464, and/or controller/processor 480 of the UE 120a.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for adjusting, means for communicating, means for providing, and means for authorizing may include a processing system, which may include one or more processors, such as processors 458, 464 and 466, and/or controller/processor 480 of the UE 120a and/or processors 420, 430, 438, and/or controller/processor 440 of the BS 110a shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
 providing, to a network entity via a second link, an indication of a first identifier (ID) of the UE used for sidelink communications with a wireless node on a first link, wherein the sidelink communications convey at least one of: position information, speed information, path information, or a combination thereof, of the UE to the wireless node;
receiving information from the network entity;
adjusting one or more parameters based on the information, wherein the one or more parameters comprise one or more parameters related to beams used for communication between the UE and the network entity; and
communicating with the network entity via the second link based on the one or more adjusted parameters.

2. The method of claim 1, wherein the wireless node has a connection to the network entity.

3. The method of claim 1, wherein the network entity comprises a cellular base station.

4. The method of claim 1, further comprising providing information to the network entity regarding an address of the wireless node.

5. The method of claim 4, wherein the information regarding the address of the wireless node is provided via a zone ID used for the sidelink communication with the wireless node.

6. The method of claim 1, wherein the first ID is provided to the network entity using a radio resource control (RRC) message.

7. The method of claim 6, wherein the RRC message comprises UE assistance information (UAI).

8. The method of claim 1, wherein the first ID comprises a medium access control (MAC) layer ID or an application layer ID of the UE used for the sidelink communication.

9. The method of claim 1, wherein the sidelink communication comprises one or more broadcast messages.

10. The method of claim 1, further comprising:
providing security information associated with the first ID, when providing the first ID to the network entity.

11. The method of claim 1, wherein the UE is located in or in proximity to a device associated with the sidelink communication.

12. The method of claim 11, further comprising obtaining the first ID from the device associated with the sidelink communication via a local wireless connection, from user entry, or from scanning a quick response (QR) code.

13. A method for wireless communications by a wireless node, comprising:
receiving one or more sidelink messages from a user equipment (UE) via a first link using a first identifier (ID) for the UE, wherein the one or more sidelink messages convey at least one of: position information, speed information, path information, or a combination thereof, for the UE;
receiving, via a second link, a request from a network entity for information associated with at least the first ID; and
transmitting, via the second link, a message to the network entity including the requested information associated with the first ID, wherein the requested information comprises at least one of: the position information, the speed information, the path information, or a combination thereof.

14. The method of claim 13, wherein the wireless node has a connection to the network entity.

15. The method of claim 13, wherein the network entity comprises a cellular base station.

16. The method of claim 13, wherein the first ID comprises a medium access control (MAC) layer ID or an application layer ID used for sidelink communication.

17. The method of claim 13, wherein the one or more sidelink messages comprise one or more broadcast messages.

18. The method of claim 13, wherein:
the one or more sidelink messages include security information associated with the first ID; and
the request received from the network entity also includes the security information.

19. A method for wireless communications by a network entity, comprising:
obtaining, from a user equipment (UE), a message indicating a first identifier (ID) for a sidelink communication;
outputting a request, including the first ID, to a wireless node for information associated with at least one of the first ID;
obtaining, from the wireless node, a message including the requested information associated with the first ID, wherein the requested information comprises at least one of: position information, speed information, path information, or a combination thereof, for the UE; and
adjusting one or more parameters for communications between the UE and the network entity based on the requested information, wherein the one or more parameters comprise one or more parameters related to beams used for communication between the UE and network entity.

20. The method of claim 19, wherein the wireless node has a connection to the network entity.

21. The method of claim 19, wherein the network entity comprises a cellular base station.

22. The method of claim 19, further comprising obtaining, from the UE, information regarding a location of the wireless node.

23. The method of claim 22, wherein the location information is provided via a zone ID associated with the sidelink communication.

24. The method of claim 22, wherein:
the network entity comprises a central unit; and
the method further comprises providing a second ID associated with the UE to at least one of: a distributed unit (DU), a remote unit (RU), or a combination thereof.

25. The method of claim 19, wherein:
the network entity also receives security information when obtaining the first ID from the UE; and
the network entity includes the security information when outputting the request.

26. The method of claim 25, further comprising:
obtaining a request from the UE to adjust the one or more parameters;
authorizing the request from the UE, based on at least one of the first ID and security information; and
outputting the request to the wireless node for the information after the authorization.

* * * * *